United States Patent
Harris et al.

(10) Patent No.: US 8,986,899 B2
(45) Date of Patent: Mar. 24, 2015

(54) SYSTEMS AND METHODS FOR ENHANCING FUEL CELL VEHICLE STARTUP

(71) Applicant: GM Global Technology Operations LLC, Detroit, MI (US)

(72) Inventors: Daniel I. Harris, Honeoye Falls, NY (US); Sriram Ganapathy, Honeoye Falls, NY (US); Michael Cartwright, Rochester, NY (US); Pinkhas A. Rapaport, Penfield, NY (US)

(73) Assignee: GM Global Technology Operations, LLC, Detroit, MI (US)

( * ) Notice: Subject to any disclaimer, the term of this patent is extended or adjusted under 35 U.S.C. 154(b) by 191 days.

(21) Appl. No.: 13/663,324

(22) Filed: Oct. 29, 2012

(65) Prior Publication Data
US 2014/0120438 A1    May 1, 2014

(51) Int. Cl.
*H01M 8/04* (2006.01)
*H01M 8/24* (2006.01)
*B60L 11/18* (2006.01)

(52) U.S. Cl.
CPC ............. *B60L 11/18* (2013.01); *H01M 8/0491* (2013.01); *H01M 8/04223* (2013.01); *H01M 8/04365* (2013.01); *H01M 8/04455* (2013.01); *H01M 8/04559* (2013.01); *H01M 2220/20* (2013.01); *Y02E 60/50* (2013.01)
USPC ............................. 429/432; 429/429; 429/452

(58) Field of Classification Search
USPC ......... 429/429, 428, 432, 431, 410, 415, 452, 429/433
See application file for complete search history.

(56) References Cited

U.S. PATENT DOCUMENTS

| | | | |
|---|---|---|---|
| 2008/0090111 A1* | 4/2008 | Kim et al. | 429/13 |
| 2008/0152972 A1* | 6/2008 | Igarashi et al. | 429/22 |
| 2009/0130497 A1* | 5/2009 | Oishi et al. | 429/13 |
| 2010/0112390 A1* | 5/2010 | Umayahara et al. | 429/13 |
| 2012/0115052 A1* | 5/2012 | Kokubu et al. | 429/410 |

FOREIGN PATENT DOCUMENTS

JP          2004134199 A   *  4/2004  ............. H01M 8/04

OTHER PUBLICATIONS

Machine Translation of: JP 2004/134199A, Koshinuma et al., Apr. 30, 2004.*

* cited by examiner

*Primary Examiner* — Kenneth Douyette
(74) *Attorney, Agent, or Firm* — Phillips Ryther & Winchester; Matthew D. Thayne

(57) ABSTRACT

Methods and systems for enhancing the performance of fuel cells in fuel cell vehicles. Some embodiments comprise a current control module for controlling the application of a load to the fuel cell and a voltage monitoring module for monitoring one or more voltages within the fuel cell. The current control module may be configured to apply a delay period before applying a load to the fuel cell after the fuel cell has reached an open circuit voltage. In other embodiments, a fixed delay period may be applied before applying a load to the fuel cell after the fuel cell has reached an open circuit voltage or, for example, an incremental set of delay periods that increase as measured temperature decreases.

9 Claims, 4 Drawing Sheets

SYSTEMS AND METHODS FOR ENHANCING FUEL CELL VEHICLE STARTUP

TECHNICAL FIELD

This disclosure relates to methods and systems for enhancing the performance of fuel cells. More specifically, but not exclusively, this disclosure relates to methods and systems for improving startup robustness for fuel cells in cold temperatures.

BACKGROUND

Fuel cells are devices that produce electricity by an electrochemical process without requiring fuel combustion. Hydrogen gas is typically electrochemically combined with oxygen gas to produce electricity. The only by-products of this process are water vapor and heat. As such, fuel cell-powered electric vehicles reduce emissions and the demand for conventional fossil fuels by eliminating the internal combustion engine or, in the case of hybrid electric vehicles, operating the engine at only certain times.

However, it has been discovered that temperature may play a role in determining the response of the fuel cell voltages during startup when both the anode and the cathode are exposed to air prior to startup. More particularly, it has been discovered that cold temperatures, and particularly sub-freezing temperatures, may contribute to undesirable delays in fuel cell vehicle startup.

Test data has indicated that the combination of electrical current during a Hydrogen starvation period and temperature during fuel cell freeze starts impact the time delay until the minimum cell voltage in the fuel cell is able to reach acceptable levels. Without being limited by theory, the present inventors suspect that growth of Platinum Oxides (Pt-Ox) on the anode catalyst within the fuel cell may inhibit the Hydrogen-Oxygen Reaction (HOR) taking place within the cell. This growth may even inhibit HOR after sufficient Hydrogen is present in the anode compartment and may therefore lead to undesirable delays during cold starts.

The present inventors have therefore determined that it would be desirable to provide methods and systems for enhancing fuel cell system startup, particularly in cold temperatures, that overcome one or more of the foregoing limitations and/or other limitations of the prior art.

SUMMARY

Methods and systems are disclosed herein for improving the performance of fuel cell systems, such as vehicle fuel cell systems, particularly in cold temperatures. In some implementations of methods for controlling a fuel cell system startup, a startup procedure may be initiated without immediately applying a load to the fuel cell. The fuel cell may then be allowed to reach an open circuit voltage. The fuel cell may comprise a fuel cell stack comprising a plurality of individual fuel cells, such as are commonly present in fuel cell vehicles.

A delay period may be applied with a current control module, for example, after the fuel cell has reached the open circuit voltage such that a load is not applied to the fuel cell until after the delay period has expired. After the delay period has expired, a load may be applied to the fuel cell with, for example, the current control module.

In some implementations, the process may comprise measuring a temperature within the fuel cell system. The temperature may be used to determine the length of delay or to otherwise determine when to apply a load to the fuel cell system. In some implementations, the step of applying a delay period may comprise using the measured temperature to estimate a minimum delay period after the fuel cell has reached the open circuit voltage for avoiding fuel cell startup delays due to cold temperatures. The step of applying a delay period may further comprise comparing an operating circuit voltage time comprising a time period during which the fuel cell has been measured at the open circuit voltage with the minimum delay period.

In some implementations, the step of applying a load to the fuel cell may comprise, in response to a determination that the operating circuit voltage time is greater than the minimum delay period, applying the load to the fuel cell. If the operating circuit voltage time is less than the minimum delay period, the system may be configured to prevent current flow. Some implementations may also comprise estimating a concentration of oxygen within the fuel cell, such as within an anode compartment of the fuel cell. In such implementations, the step of applying a delay period may comprise using both the measured temperature and an estimated concentration of oxygen within the anode compartment of the fuel cell to estimate a minimum delay period after the fuel cell has reached the open circuit voltage for avoiding fuel cell startup delays due to cold temperatures. The step of applying a delay period may, in such implementations further comprise comparing an operating circuit voltage time comprising a time period during which the fuel cell has been measured at the open circuit voltage with the minimum delay period. In response to a determination that the operating circuit voltage time is greater than the minimum delay period, a load may be applied to the fuel cell.

Some embodiments of vehicle fuel cell systems may comprise a fuel cell and a current control module for controlling the application of a load to the fuel cell. A voltage monitoring module may also be included for monitoring one or more voltages within the fuel cell. The current control module may be configured to apply a delay period before applying a load to the fuel cell after the voltage monitoring module has detected that the fuel cell has reached an open circuit voltage.

The current control module may be configured to apply a delay period before applying a load to the fuel cell after the voltage monitoring module has detected that each of the individual fuel cells has reached an open circuit voltage. In some embodiments, the delay period may be fixed. In other embodiments, the delay period may vary depending upon, for example, the temperature and/or the concentration of oxygen in the anode compartment. In embodiments in which the delay period is fixed, the delay period may be between about 0.2 and about 5.0 seconds. In some such embodiments, the delay period may be between about 0.9 seconds and about 2.0 seconds.

Some embodiments may comprise a temperature sensor configured to sense a temperature within the fuel cell. The current control module in such embodiments may be configured to receive temperature readings from the temperature sensor. And the current control module may be configured to use a temperature reading from the temperature sensor to determine when to apply a load to the fuel cell.

Some embodiments may also comprise an oxygen concentration module configured to obtain an at least approximate concentration of oxygen within an anode compartment of the fuel cell. Such an oxygen concentration module may be configured with one or more sensors to measure the oxygen content within the anode compartment. Such an oxygen concentration module may also, or alternatively, comprise one or more algorithms or other data structures for providing an estimate of the oxygen content within the anode compartment.

The current control module may be configured to receive an at least approximate concentration of oxygen within the anode compartment of the fuel cell and further configured to use the at least approximate concentration of oxygen within the anode compartment to determine when to apply a load to the fuel cell. The at least approximate concentration of oxygen may be used along with, or in lieu of, use of temperature data in this manner.

Some embodiments of vehicles including fuel cell systems may comprise a fuel cell stack comprising a plurality of fuel cells, a current control module for controlling the application of a load to the fuel cell stack, and a voltage monitoring module for monitoring one or more voltages within the fuel cell stack. The current control module may be configured to apply a delay period before applying a load to the fuel cell stack after the voltage monitoring module has detected that each of the fuel cells within the fuel cell stack has reached an open circuit voltage.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
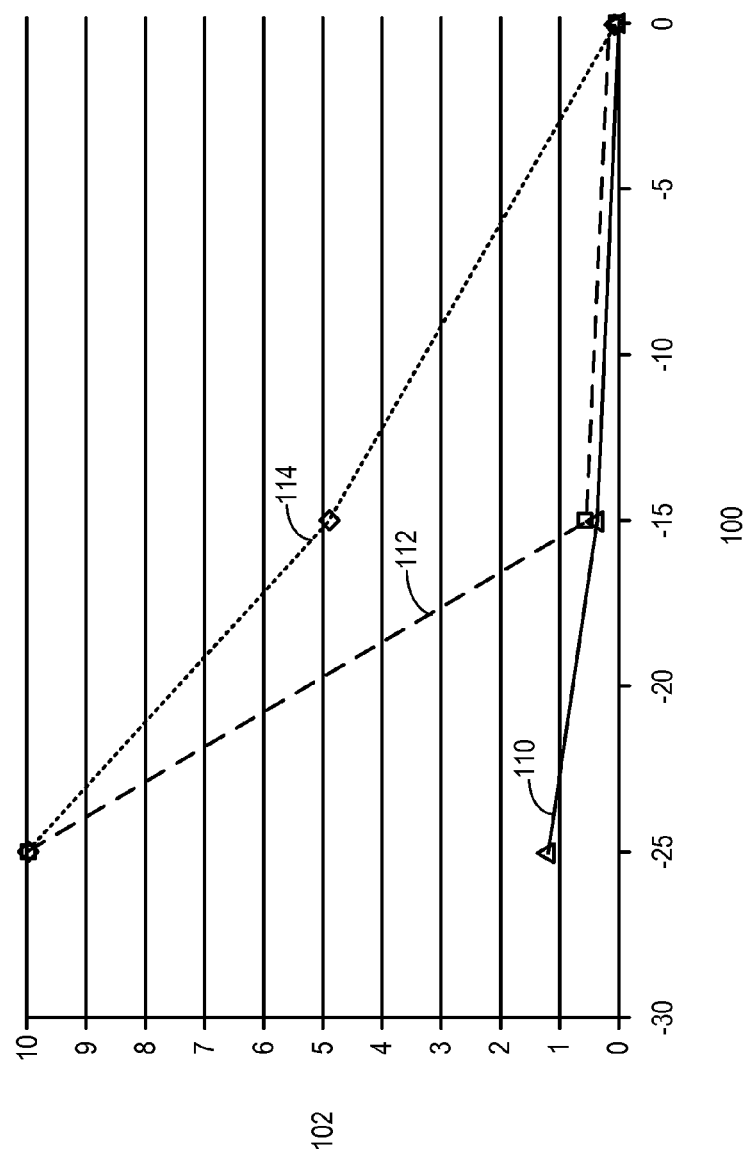
FIG. 1 illustrates a graph showing the results of a test involving fuel cell voltage rise delays associated with cold temperatures.

A detailed description of apparatus, systems, and methods consistent with various embodiments and implementations of the present disclosure is provided below. While several embodiments and implementations are described, it should be understood that disclosure is not limited to any of the specific embodiments and/or implementations disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Similarly, some implementations can be practiced without some or all of the steps disclosed below. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the methods, systems, and apparatus disclosed herein may be used to improve the performance of fuel cell systems, such as vehicle fuel cell systems, particularly in cold temperatures. The present inventors have determined that fuel cell system starts in freezing temperatures are impeded and subject to considerable delays. Without being limited by theory, the present inventors suspect that growth of Pt-Ox on the anode catalyst within the fuel cell may inhibit the HOR taking place within the cell. More particularly, it is presumed that, when a load is applied to the fuel cell stack during a freeze start condition, Pt-Ox formation occurs on the anode surface, and that this growth may even further inhibit HOR after sufficient hydrogen is present in the anode compartment and may therefore lead to undesirable delays during cold starts.

To test the Pt-Ox effect, a fuel cell stack test stand was retrofitted with coolant chilling capability and was used to evaluate the impact of temperature on the reduction of the anode surface. After purging to an air-air state (oxygen in both anode and cathode compartments), the fuel cell stack was chilled to the test temperature. The test stand was set to source the test current from the stack as soon as the terminal voltage was adequate for the load bank to function. The test was completed for several start temperature and electrical load set points. The resultant data was processed to calculate the delay from the time at which the anode pressure reached 200 kPa, which typically indicates the presence of significant Hydrogen in all cells, to the time that the measured minimum cell voltage exceeded 400 mV. Ten seconds was set as the upper limit allowed by the test.

FIG. 1 depicts a chart illustrating the results of this testing. Temperature in degrees Celsius is plotted along the "X" axis at 100, and the delay (in seconds) from the time at which the anode pressure reached 200 kPa to the time that the measured minimum cell voltage exceeded 400 mV is plotted along the "Y" axis at 102. Line 110 illustrates drawing a current of 0.01 A/cm$^2$, line 112 illustrates drawing a current of 0.05 A/cm$^2$, and line 114 illustrates drawing a current of 0.1 A/cm$^2$. As illustrated in FIG. 1, substantial delays (up to 10 seconds) result from air starts in cold temperatures when a load is applied immediately, and the delays tend to increase as temperatures decrease.

To ameliorate such delays, a revision to the stack current control may be made during a startup mode. By adding a short delay before the load is applied, it has been discovered that the substantial delays described above may be avoided. After a short period of time at open circuit voltage, significant current can be drawn from the fuel cell stack without risk of insufficient HOR kinetic rates. Without being limited by theory, it is thought that application of delay periods before applying a load may decrease the presence of Pt-Ox during a freeze start.

Figure 2:
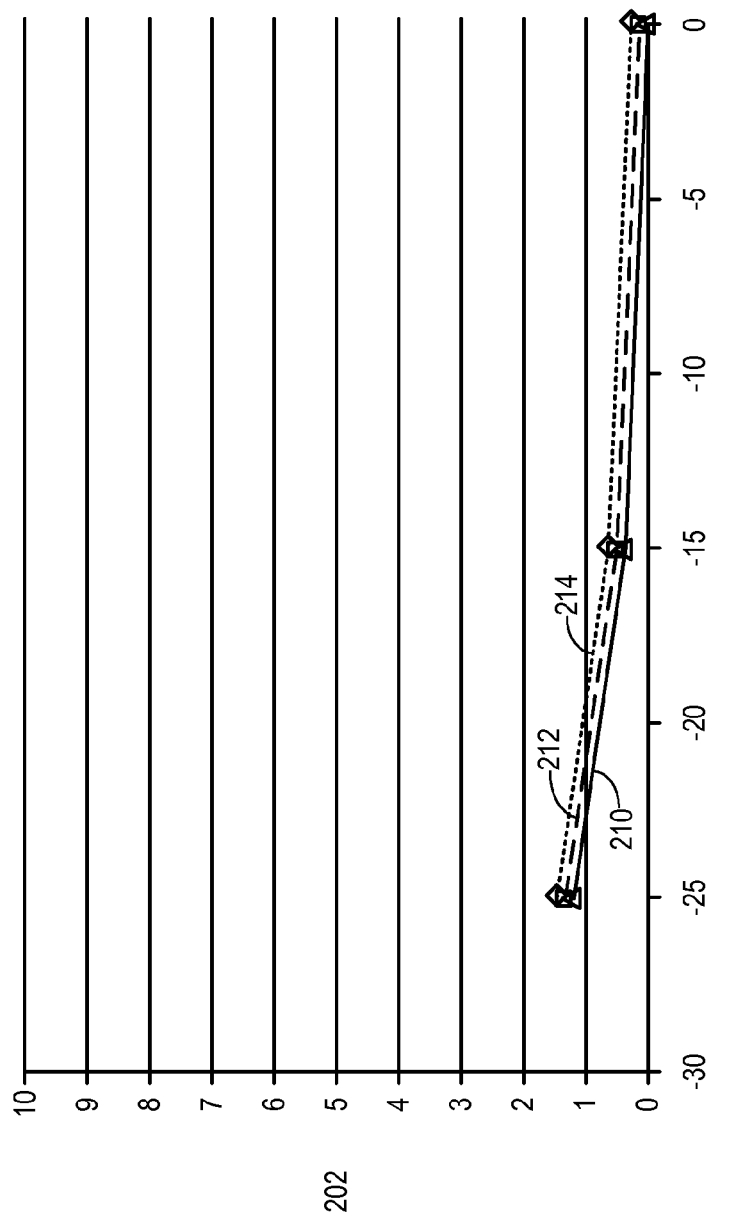
FIG. 2 illustrates a graph showing the results of a test involving fuel cell voltage rise delays associated with cold temperature after applying a short delay period before applying a load to the fuel cell.

FIG. 2 depicts another chart illustrating the results of a repeat of the testing described above in connection with FIG. 1, but with a delay period of 0.9-2.0 seconds added between the application of Hydrogen pressure and the application of the load. Similar to the chart shown in FIG. 1, the chart shown in FIG. 2 illustrates temperature in degrees Celsius along the "X" axis at 200 and illustrates the delay (in seconds) from the time at which the anode pressure reached 200 kPa to the time that the measured minimum cell voltage exceeded 400 mV along the "Y" axis at 202. Line 210 illustrates drawing a current of 0.01 A/cm$^2$, line 212 illustrates drawing a current of 0.05 A/cm$^2$, and line 214 illustrates drawing a current of 0.1 A/cm$^2$. As illustrated in FIG. 2, applying this relatively short delay period at open circuit voltage enabled the fuel cell to support electrical loads much earlier than the immediate onset of a load shown in FIG. 1.

Figure 3:
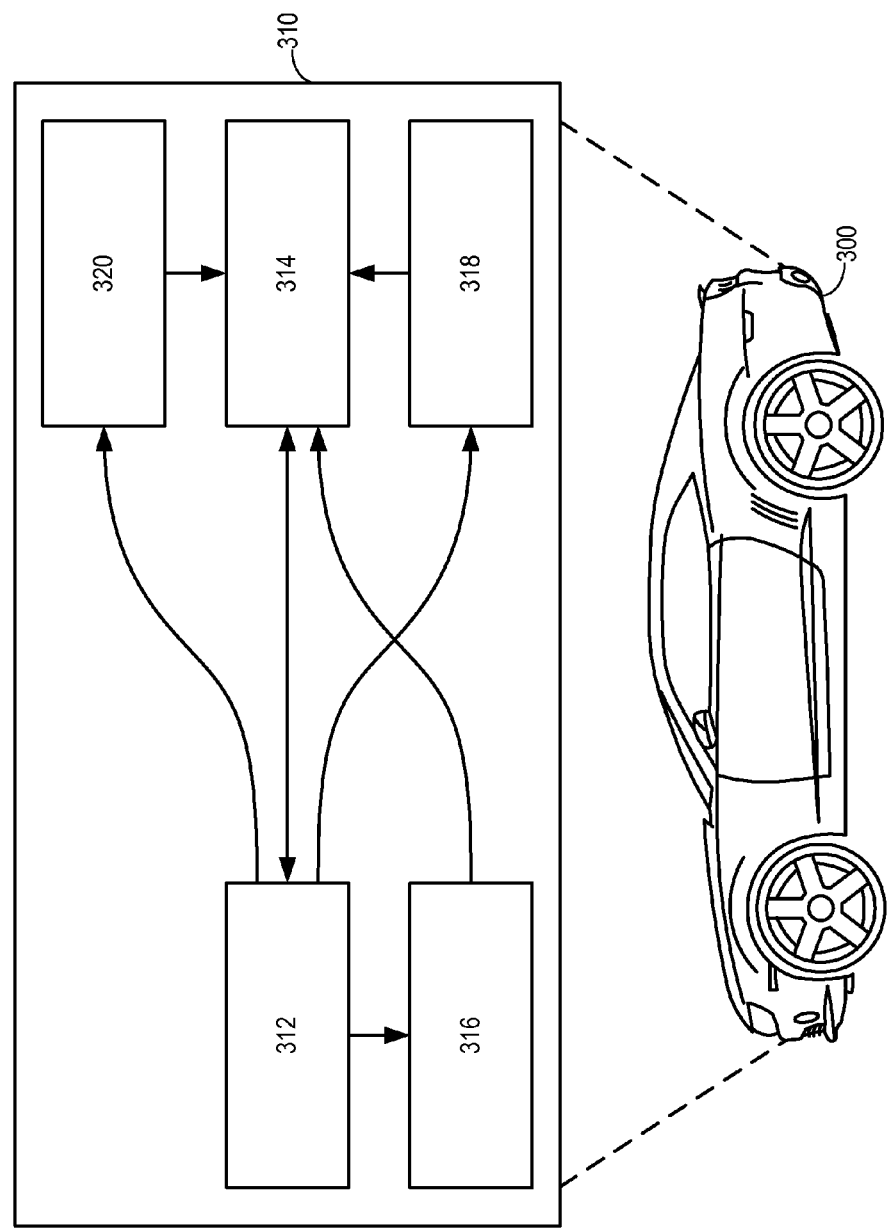
FIG. 3 illustrates an embodiment of a vehicle comprising a fuel cell system for improving fuel cell startup performance in cold temperatures.

FIG. 3 illustrates an example of a vehicle 300 comprising a fuel cell system 310. Fuel cell system 310 comprises a fuel cell 312, which may comprise a fuel cell stack comprising a plurality of individual fuel cells. Fuel cell system 310 may further comprise a current control module 314 for controlling the application of a load to fuel cell 312, a voltage monitoring module 316 for monitoring one or more voltages within fuel cell 312, a temperature sensor 318 configured to sense a temperature within fuel cell 312, and an oxygen concentration module 320 configured to obtain an at least approximate concentration of oxygen within a particular location within fuel cell 312, such as within an anode compartment of fuel cell 312.

Current control module 314 may comprise, for example, a central processing unit (CPU), RAM, ROM, an interface circuit, and may be configured to receive signals from various sensors throughout fuel cell system 310, such as temperature sensors, pressure sensors, voltage sensors, current sensors, and the like. Current control module 314 may also be configured to regulate the speed of various pumps and/or compressors, in addition to controlling the operation of various valves that may be involved in regulating the flow of gases, such as hydrogen gas, to thereby regulate the generation of voltage and/or flow of current generated by fuel cell system 310. The current control may also, or alternatively, be accomplished by way of passive elements, such as temperature dependent resistors, transistors, inductors, or capacitors.

Voltage monitoring module 316 may be configured to sense the amount of voltage generated by one or more individual fuel cells within fuel cell stack 312. Alternatively, voltage monitoring module 316 may be configured to sense a single voltage across each of the individual cells collectively. Voltage monitoring module 316 may comprise any number of elements and structures available to one of ordinary skill in the art. Examples of such elements/structures can be found in U.S. Pat. No. 5,170,124 titled "Method and Apparatus for Monitoring Fuel Cell Performance," which is hereby incorporated by reference in its entirety. However, in some embodiments, the individual cell voltages may be measured and processed, rather than doing so in groups.

Current control module 314 may be configured to apply a delay period before applying a load to the fuel cell 312 after the voltage monitoring module 316 has detected that the fuel cell 312 has reached an open circuit voltage. In some embodiments, this delay may be fixed. For example, in some embodiments, the current control module 314 may be configured to simply apply a fixed delay period of between about 0.2 and about 5.0 seconds. In some such embodiments, the delay period may be between about 0.9 seconds and about 2.0 seconds. In other embodiments, the delay period may vary based upon one or more variables, such as temperature and/or the concentration of oxygen or hydrogen within a particular location within the fuel cell 312, such as within the anode compartment.

In embodiments in which the delay period varies, the current control module 314 may be configured to receive temperature readings from the temperature sensor 318. Temperature sensor 318 may be positioned and configured to obtain a temperature reading from within fuel cell 312, such as within an anode compartment of fuel cell 312. Alternatively, temperature sensor 318 may be positioned and configured to obtain a temperature reading from elsewhere within vehicle 300, or from the exterior environment to vehicle 300. Current control module 314 may be configured to use a temperature reading from temperature sensor 318 to determine when to apply a load to fuel cell 312. For example, a delay period may only be applied when a temperature below a certain threshold, such as −10 degrees Celsius for example, is reached. Alternatively, the delay period may vary depending upon the temperature reading. As still another alternative, the temperature reading may be used in a comparison step using, for example, a table of data, along with another data point, such as the time at which the fuel cell 312 has been operating at open circuit voltage, in order to determine whether to apply a load to the fuel cell 312.

Fuel cell system 310 may also comprise an oxygen concentration module 320. Oxygen concentration module 320 may be configured to obtain an at least approximate concentration of oxygen within a particular location within fuel cell 312, such as within an anode compartment of fuel cell 312. Oxygen concentration module 320 may comprise one or more sensors to measure the oxygen content within the anode compartment. Such oxygen sensors may comprise, for example, a diffusion barrier, a sensing electrode (cathode), and a working electrode made of a base metal immersed in a basic electrolyte. Oxygen concentration module 320 may also, or alternatively, comprise one or more algorithms or other data structures for providing an estimate of the oxygen content within the anode compartment rather than a direct measurement of such content.

Current control module 314 may be configured to receive an at least approximate concentration of oxygen within the anode compartment of fuel cell 312 from oxygen concentration module 320, and may be further configured to use the at least approximate concentration of oxygen within the anode compartment to determine when to apply a load to fuel cell 312. The at least approximate concentration of oxygen from oxygen concentration module 320 may be used along with, or in lieu of, temperature data in order to determine when to apply a delay and/or how long the delay period should be.

Figure 4:
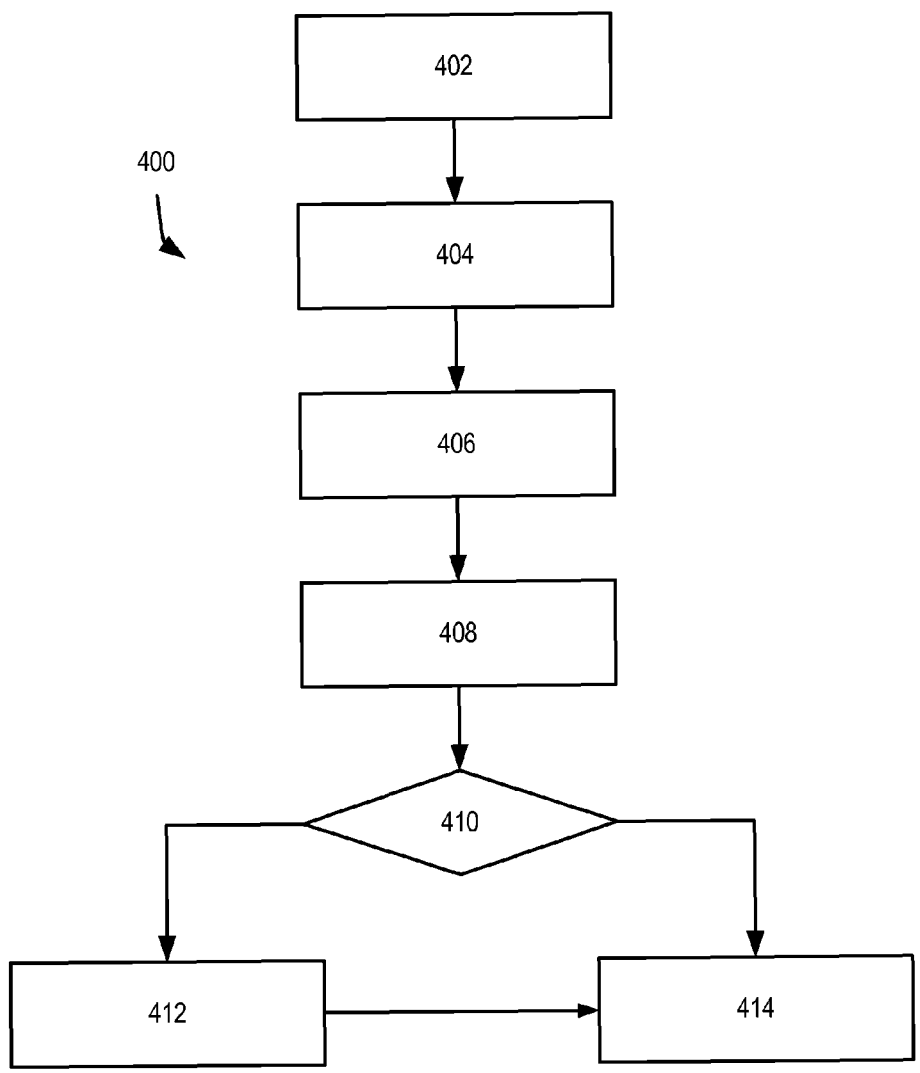
FIG. 4 illustrates a flow chart of one implementation of a method for controlling a fuel cell system startup to improve startup performance in cold temperatures.

FIG. 4 illustrates an example of a method 400 for controlling a fuel cell system startup. At step 402, a startup procedure may be initiated without applying a load to the fuel cell. At step 404, the fuel cell may be allowed to reach an open circuit voltage.

At step 406, one or more measurements may be taken that may bear on, for example, whether to apply a delay period and/or the length of such a delay period. For example, in some implementations, step 406 may comprise measuring a temperature, such as a temperature within the fuel cell system. As described elsewhere herein, the temperature may be used to determine the length of delay or to otherwise determine when to apply a load to the fuel cell system. In some implementations, step 406 may also, or alternatively, comprise measuring, or estimating, a concentration of oxygen within the fuel cell, such as within an anode compartment of the fuel cell.

At step 408, an estimate of the time required for the fuel cell system to be at the open circuit voltage at the measured temperature in order to avoid undue startup delays or otherwise achieve robust fuel cell startup may be calculated or otherwise obtained. In some embodiments, this may be done by using a table of data with temperatures and/or oxygen content data. This table of data may be input from test data, such as the test data illustrated in FIG. 2, for example.

At step 410, the estimate of the time required at open circuit voltage for the fuel cell system to achieve robust startup may be compared with the time at which the fuel cell has been operating at open circuit voltage in order to determine which value is greater. If the open circuit voltage time required for robust startup at the measured temperature and/or oxygen content is greater than the operating time at open circuit voltage, then a delay period is applied at step 412. In other words, a load is not applied to the fuel cell at step 412.

If, on the other hand, open circuit voltage time required for robust startup at the measured temperature and/or oxygen content is less than the operating time at open circuit voltage, then a load is applied to the fuel cell at step 414. It can be seen from FIG. 4 that step 414 can be reached from either step 410 or step 412. In other words, the load can be applied immediately at step 414 upon determining that the fuel cell has been operating at open circuit voltage for a sufficient time period to avoid undue startup delays at step 410. If, on the other hand, the fuel cell has not been operating at open circuit voltage for a sufficient time, a delay period can be applied at 412, after which the load can be applied at step 414.

In some implementations, step 412, or one of the previous steps, may comprise using both the measured temperature and an estimated concentration of oxygen within the anode compartment of the fuel cell to estimate a minimum delay period after the fuel cell has reached the open circuit voltage for avoiding fuel cell startup delays due to cold temperatures.

As described above, the delay period may be applied in some implementations with a current control module. In some implementations, after the delay period has expired, a load may be applied to the fuel cell with the current control module.

It should be understood that the steps depicted in FIG. 4 do not necessarily need to be executed in the order depicted. Similarly, it should be understood that some of the steps may be omitted, and other steps may be added, in other implementations of methods according to the principles set forth herein. For example, as mentioned above, some implementations may comprise applying a fixed delay period that does not vary based upon temperature. Such delay periods may be selected so as to avoid startup delays that would result from temperatures within a given range that would be expected to be encountered by a vehicle, such as between about 10 degrees Celsius and about −40 degrees Celsius, for example. Other embodiments may be configured to apply a fixed delay period within a particular range of temperatures and increase the delay period at a particular threshold, or incrementally at a series of thresholds. For example, in some embodiments, a delay of about 0.2 seconds may be applied at temperatures at or below about 10 degrees Celsius, a delay of about 0.5 second seconds may be applied at temperatures at or below about 0 degrees Celsius, a delay of about 1 second may be applied at temperatures at or below about −20 Celsius, a delay of about 2 seconds may be applied at or below about −30 Celsius, and a delay of about 5 seconds may be applied at temperatures at or below about −40 degrees Celsius. In some embodiments, when the measured temperature is between the aforementioned table values, linear interpolation may be used to determine a desired delay.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for controlling a fuel cell system startup, the method comprising the steps of:
    initiating a startup procedure for a fuel cell system without applying a load to a fuel cell of the fuel cell system;
    allowing the fuel cell to reach an open circuit voltage;
    measuring a temperature within the fuel cell system;
    applying a delay period with a current control module after the fuel cell has reached the open circuit voltage by using a measured temperature to estimate a minimum delay period after the fuel cell has reached the open circuit voltage for avoiding fuel cell startup delays due to cold temperatures; and
    applying a load to the fuel cell with the current control module after the minimum delay period has expired.

2. The method of claim 1, wherein the step of applying a delay period further comprises comparing an operating circuit voltage time comprising a time period during which the fuel cell has been measured at the open circuit voltage with the minimum delay period.

3. The method of claim 2, wherein the step of applying a load to the fuel cell comprises, in response to a determination that the operating circuit voltage time is greater than the minimum delay period, applying the load to the fuel cell.

4. The method of claim 1, further comprising estimating a concentration of oxygen within the fuel cell.

5. The method of claim 4, wherein the step of estimating a concentration of oxygen within the fuel cell comprises estimating a concentration of oxygen within an anode compartment of the fuel cell.

6. The method of claim 5, wherein the step of applying a delay period comprises using the measured temperature and an estimated concentration of oxygen within the anode compartment of the fuel cell to estimate a minimum delay period after the fuel cell has reached the open circuit voltage for avoiding fuel cell startup delays due to cold temperatures.

7. The method of claim 6, wherein the step of applying a delay period further comprises comparing an operating circuit voltage time comprising a time period during which the fuel cell has been measured at the open circuit voltage with the minimum delay period.

8. The method of claim 7, wherein the step of applying a load to the fuel cell comprises, in response to a determination that the operating circuit voltage time is greater than the minimum delay period, applying the load to the fuel cell.

9. The method of claim 1, wherein the fuel cell comprises a fuel cell stack comprising a plurality of individual fuel cells.

\* \* \* \* \*